July 14, 1953     P. W. ABELES     2,645,115
COMPOSITE STRUCTURAL MEMBER AND IN THE MANUFACTURE THEREOF
Original Filed Feb. 25, 1943     2 Sheets-Sheet 1

INVENTOR.
Paul W. Abeles
BY
Michael S. Striker
agt.

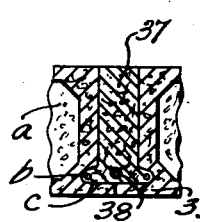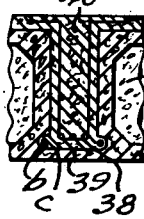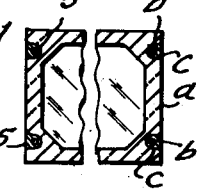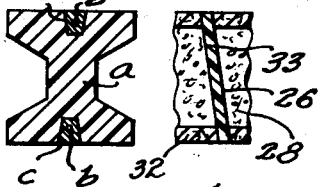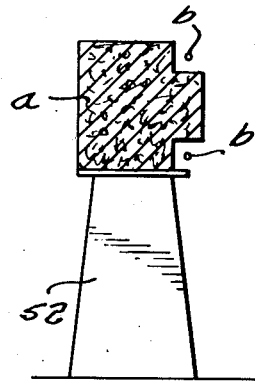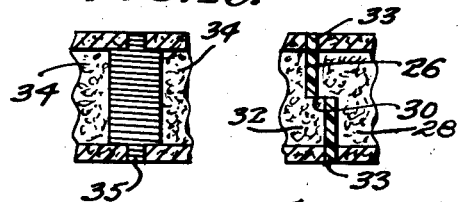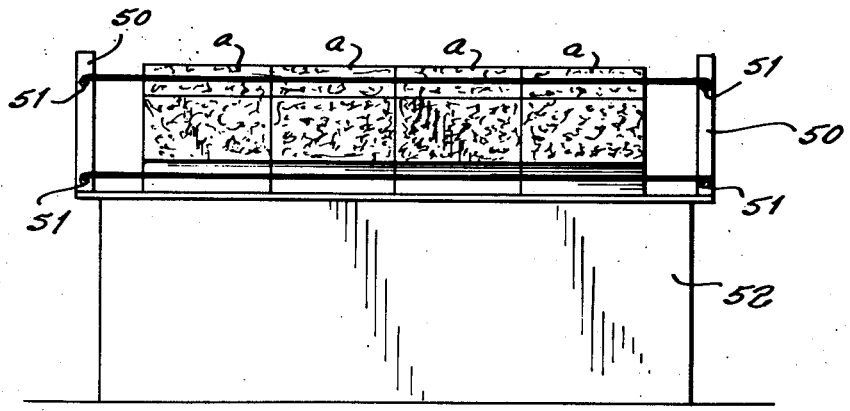

Patented July 14, 1953

2,645,115

UNITED STATES PATENT OFFICE 2,645,115

COMPOSITE STRUCTURAL MEMBER AND IN THE MANUFACTURE THEREOF

Paul William Abeles, London, England

Original application February 25, 1943, Serial No. 477,118. Divided and this application June 26, 1947, Serial No. 757,252. In Great Britain March 3, 1942

10 Claims. (Cl. 72—61)

My invention relates to composite structural units, intended in use to be strained mainly by bending, such as a beam, girder, floor, frame, wall member or the like, and relates more particularly to a combination of an assembly of blocks and tensioned ties. My invention relates also to methods of manufacturing such structural units.

It is an object of my present invention to prevent in a composite structural unit composed of an assembly of a plurality of blocks the opening of the joints between consecutive blocks due to working load and/or shrinkage of the blocks and/or the jointing material between these blocks.

With the above object in view, a composite structural unit according to my present invention preferably comprises in combination an elongated block assembly provided in its external surface with at least one continuous groove extending in longitudinal direction of this block assembly, at least one prestressed metal tie disposed in this groove and being under an effective tension of at least 20,000 lbs. per square inch and an adhesive filler arranged in this groove adhering both to the molded blocks and said prestressed metal tie so as to permanently force the blocks forming the block assembly toward each other.

Another object of my present invention consists in new methods of manufacturing structural units including prestressed metal ties in such a manner that the tension force applied to the ties does not compress the molded element or blocks during manufacture.

With the above object in view, a preferred method according to my present invention comprises in combination the steps of arranging in the groove of a molded element or the aligned grooves of a block assembly a thin metal tie member being anchored to independent anchorages under a tension in excess of 20,000 lbs. per square inch so that the molded element or block assembly is, during manufacture of the structural unit, free of compression by the independent anchorages.

The molded component or the blocks forming the block assembly may be formed from the following products:

(a) Concrete or the like products, characterised by the fact that the plastic substance consists of a mixture of natural or artificial, preferably suitably graded aggregates of light or heavy weight, and of a binding agent such as cement, lime, glue, synthetic resin or a material or similar properties, the resulting product being any of those known as concrete, lightweight-concrete (of pumice, foamed slag, cork, saw-dust), artificial stone, artificial lime-stone, synthetic concrete, dry clay or dry earthenware.

(b) Brick or the like products, characterised by the fact that the moulded product is burnt, the resulting products being known as brick, burnt clay or burnt earthenware.

(c) Glass or the like products, characterised by the fact that the products are moulded in melted consistency and harden when cooling.

(d) Plastics or the like products, characterised by the fact that the products are moulded under high pressure and heat, using synthetic resins which are either thermo-setting or thermo-plastic.

The accompanying drawings show diagrammatically structural units according to my invention and methods of carrying my invention into practice.

In the drawings,

Figures 3, 4–9, 12 and 13 are cross sections through various beams such as are shown in Figures 1 and 2;

Fig. 3a shows details of the structure of Fig. 3;

Figs. 10 and 11 show joints between pairs of blocks;

Figures 14 to 16 are fragmentary longitudinal sections through joints of beams according to Figure 1 or 2;

Figs. 17 and 18 are a cross section and side view, respectively, illustrating method of assembly of composite structural members according to my invention.

Figure 1:
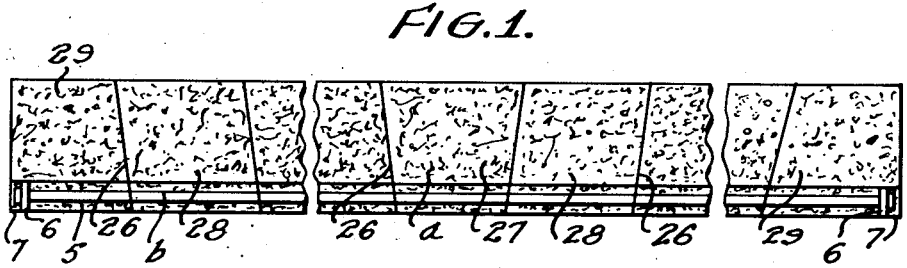
Figures 1 and 2 are views, in front elevation, of a composite beam according to my invention.
Figure 2:
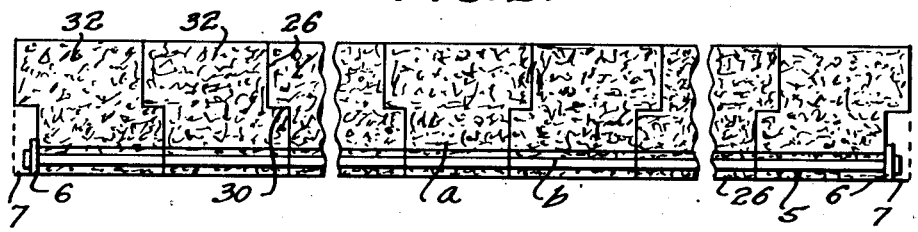

In the longitudinal views of Figures 1 and 2, and in the cross sections, Figures 3 to 9, there are illustrated various composite structural units according to my invention comprising the molded blocks $a$, having aligned grooves or recesses, two pre-stressed tie members $b$ and adhesive cement mortar $c$ entirely surrounding the tie members $b$. The single blocks $a$ have preferably inclined adjoining surfaces 26 arranged symmetrically to the centre of the beam in order to ensure a better load transmission and to prevent the ties $b$ from being strained by shear (see Figure 1). Thus three different shapes of blocks are provided, a centre block 27, a number of intermediate blocks 28 and two end-blocks 29. In another form of a composite beam according to my invention, as shown in Figure 2, the joints 26 have horizontal portions 30 for the load transmission in order to avoid shear stresses in the ties. In this case only the centre block differs from the other blocks 32 which may also be used for the end blocks. It is, of course, possible to form the single blocks differently from the shapes shown in Figures 1 and 2 and to provide any other form of interlocking between them, for instance, tongues and grooves. At the joints, thin layers of cement mortar or other adhesive or cohesive filler may be provided. When cement mortar is used, it is advisable to apply rather dry high strength mortar, since in the majority of cases the strength of the blocks $a$ will be greater than that of normal mortar. When a number of such units is to be assembled, this is advantageously carried out horizontally on a platform. In order to ensure great strength and equal thickness of the joints it is advisable when an adhesive cement mortar is used, to lay one block beside the other after the cement mortar has been placed on the joints and to tie the assembly together temporarily with a soft wire while the mortar hardens. The soft wire can readily be untwisted and unwound from the assembled plurality of blocks, connected together.

Figures 3, 3A, 4, 5, 6:
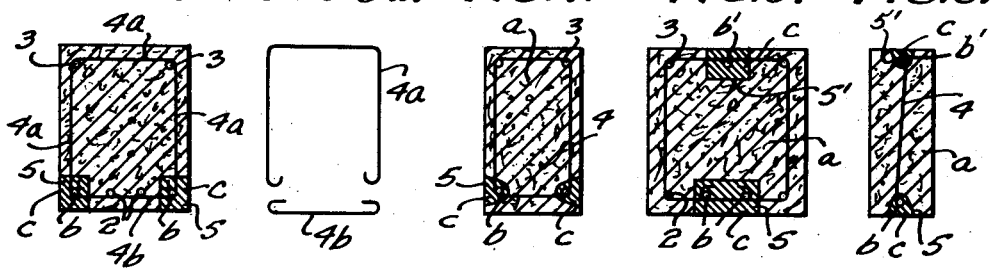
Figure 7:
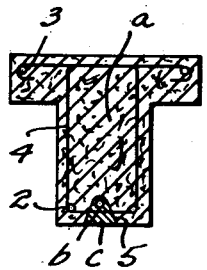

According to the cross section, Figure 3, in each moulded reenforcement concrete block $a$ there may be provided short longitudinal reenforcing members 2 (at the lower tensile zone) and 3 (at the upper compressive zone) with transverse links 4, the latter preferably consisting of 2 parts 4a and 4b, as shown in Figure 3a, thus allowing the tie members $b$ simply to be lodged in longitudinal external grooves or recesses 5 formed in the molded block $a$, the two link-reenforcements then being connected to the ties $b$ for instance by twisting them together when wire-links are used or by hooking them round the tie members $b$ when the links are in the form of rods or strips, as shown in Figures 3 and 3a. At the ends of the tie members $b$ anchor plates 6 are provided, preferably in recesses 7 in the beams in order to permit of filling the recesses with the filler $c$, thus protecting also the anchorage means against rusting and/or fire. Figure 4 shows, in section, an alternative form of beam in which the grooves or recesses 5 and the adhesive filler $c$ are not at the lower corners but near to the lower end of the side surfaces, no longitudinal reenforcing members 2 being provided. Another rectangular section of a composite structural member according to my invention is shown in Figure 5 in which there is provided one groove or recess 5 in the lower surface wherein two tie members $b$ are arranged and another groove or recess 5' in the upper surface of the section where one tie member $b'$ is located, the longitudinal reenforcement 2 being especially weak and provided only for the purpose of positioning the links 4 which consists of two C-shaped parts, the ends of which extend into the grooves or recesses 5 and 5' and are closed after the tie members $b$ and $b'$ have been lodged in their grooves or recesses 5 and 5' respectively. Figure 6 illustrates a similar section but without having longitudinal reenforcing members 2 and 3, the links 4 consisting of single members extending into the grooves or recesses 5 and 5' and bent around the tie members $b$ and $b'$ after they have been fixed. But said links 4 need not be connected with the ties $b$ and $b'$ and may be provided only in the interior of the sections, shown in Figures 3 to 5, without extending into the grooves or recesses or may be dispensed with altogether in a section according to Figure 6. An upper tie member $b'$ is preferably provided when the composite structural member is to be fully pre-stressed. Figure 7 shows a T-section, only one groove or recess 5 being provided along the lower surface, the links 4 consisting preferably of two parts which are closed after the tieing member $b$ has been lodged in the groove or recess.

Figures 8, 9:
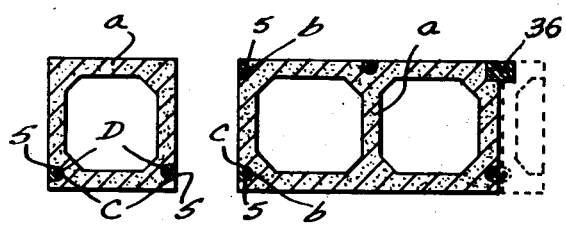

Figures 8 and 9 illustrate cross sections of several hollow blocks which may advantageously be used for floor- or wall-beams, the molded component $a$ preferably being of a ceramic substance. Floors or walls may be formed by the assembly one beside another of the single composite structural members shown in Figure 8, the single beams being produced in the same manner as described hereinbefore. When the hollow blocks have wire-cut joints (it means if they are produced in greater length and are cut to length), it is advisable to provide mortar-joints between the single blocks, since the surfaces at the single joints are not equal, but it is also possible to assemble the single blocks with dry joints. The filler in the grooves 5 may be either of an adhesive or cohesive substance. Especially for temporary purposes it is advisable to provide fillers of cohesive material at the grooves only and to have the joints between the single blocks and those between the single composite beams either dry or also with a cohesive filler. In such a case the single beam can easily be dislodged and dismantled and the blocks used again. In such floors it is also possible to provide a cement key 36 at the upper grooves between two adjacent beams as shown in Figure 9. A better load distribution even if no such key 36 exists may be ensured between adjacent composite beams by interlocking of the adjacent surfaces at the joints of the single beams. Figures 10 and 11 show another application of such composite structural members according to my invention to composite floor. In these cases the carrying capacity of such composite structural members may be not sufficient to serve independently as floor beams, for example, because the strength of the blocks is too small or the wire-tie wound round the assembled blocks is too weak. In this case special concrete members 37 with or without an additional longitudinal untensioned reinforcement 38 may be provided, the hollow blocks having ledges 39 as shown in Figures 10 and 11, and a concrete slab 40 may be arranged above the ceramic blocks and additional links 41 may be provided in the concrete elements, as shown in Figure 11. Similar constructions have previously been proposed, but my proposition differs therefrom in that the composite structural member consists of an assembly of three different components, having the advantages hereinbefore described.

Figure 12 shows in cross section the application of my invention to blocks of glass-bricks to form composition structural elements suitable for use for glass floors.

Generally it will be preferable to have such assembled composite structural members fully pre-stressed, in order to avoid an opening of the joints. But it might be suitable to reduce the stretching force required for fully pre-stressing, which is possible when additional unstretched reinforcing members, preferably also of high strength steel, are provided in the grooves, which are filled with an adhesive mortar.

My invention allows also of the use of blocks made of synthetic resinous plastics for structural members strained mainly by bending.

Such products have relatively great compressive and tensile strength, but their practical application for load-bearing constructions has been limited, owing to the limited size suitable for mass-production. According to my invention it is possible to make use of the great compressive strength of certain resinous plastic products by forming a light composite structural member of great carrying capacity by using super high tensile wire as ties and by application to such wires a tension of such a magnitude that at the designed load only permanent compressive stresses occur. Figure 13 illustrates an example of such a composite structural member in cross-section. Such an I-shaped section has also considerable resistance against buckling which is required for aircraft construction where a great carrying capacity combined with a small weight is of importance. The relative compressive strength, i. e. the strength divided by the gravity is for synthetic resinous materials much greater than for mild steel, it amounts for the latter to about 6000 lbs. per square inch (specific gravity 7.65), whereas, for example, Duramoid (consisting of thin layers of veneers which are impregnated with an alcoholic solution of phenolic resin and are pressed together under heat) has a relative compressive strength of 7,700 to 13,950 lbs. per square inch (specific gravity being 1.27 to 1.4) and a resinous cord material has a relative compressive strength of even 20,100 lb. per sq. in. (specific gravity 1.34), which shows the great possibilities which can be developed by using such assembled composite structural members for load-bearing purposes.

Figures 14 and 15 show longitudinal sections through joints corresponding to those illustrated in Figures 1 and 2 respectively, 33 representing the fillers at the joints. The blocks 28 and 32 may advantageously be of hollow cross sections similar to the sections shown in Figures 8 and 9. Where a cohesive and plastic filler is used at the joints there is no need for a temporary tieing. Such a filler is preferably used if the blocks are of relatively great compressive strength and the outside surfaces of the single blocks are smooth, in which cases a less strong mortar joint would tend to weaken the whole construction, and such cohesive plastic filler, e. g. asphalt or the like or a very thin layer of rather plastic cement mortar, serves actually only to fill any unevenness in the joint surfaces of the single blocks so as to ensure a good transmission of the pressure, with the greatest stresses occurring in the case of fully pre-stressing at tieing and transmitting of the pressure to the endblocks. If the blocks are accurately molded and the interlocking joints fit exactly into each other and ensure a safe transmission of the pressure, no joint filler is necessary. On the other hand, if the joints are rather uneven an adhesive cement mortar filler of great strength is desirable. It is also possible to use as joint filler a readily compressible product of a fibrous material such as for instance, roofing felt or a cement-wool slab. Figure 16 illustrates a joint in a longitudinal section when a special intermediate member 35, interlocking into the hollows of the adjacent blocks 34 is provided at each joint, in which case the surfaces of the blocks 34 at the single straight joints may remain dry or may be provided with an adhesive or cohesive layer as described hereinabove.

It is to be understood that the invention is equally applicable to molded blocks $a$ of other cross sectional shapes than those described above, such as for instance, composite plastic constructions generally, strained in one or more directions, representing the block $a$.

In the following there is described a simple method of manufacture of composite structural units according to my invention.

This method of simple assembly is illustrated in Figures 17 and 18. In this method the tie members $b$ are tensioned before they are lodged in the grooves or recesses of the single units as shown in Fig. 17. Said ties $b$ are tensioned as shown in Fig. 18 between anchors 50 for a relatively great length by any known pulling device, for example, when thin wires are used by winding them up round screws 51 like a piano. The assemblies of blocks $a$ are placed on the platform 52 or similar support, one unit along another, in such a way that preferably two tensioned ties $b$ are lodged within the respective groove or grooves (recess or recesses).

Then the filler is brought into the grooves and recesses in the same way as described hereinbefore so that it would be possible to transfer the pre-compression to the blocks $a$ only by virtue of the bond of the adhesive filler $c$ without using temporary gripping devices when allowing the filler $c$ to harden before the wires are cut. In all cases it will be advantageous to locate the wires in such a way that the adhesive filler $c$ entirely surrounds the ties $b$.

My present application is a division of my copending U. S. patent application Serial No. 477,118, filed February 25, 1943, now U. S. Patent No. 2,455,153.

I claim:

1. A composite structural unit comprising in combination an elongated assembly of a plurality of blocks, said elongated block assembly provided in opposite faces of its external surface with two symmetrically arranged continuous grooves extending in longitudinal direction of said elongated block assembly and each having a cross-sectional area being a fraction only of the cross-sectional area of the finished composite structural unit; at least one prestressed metal tie member disposed in each of said relatively shallow grooves near the external surface of said elongated block assembly and being under an effective pre-stressed tension of at least 20,000 lbs. per square inch; and an adhesive filler arranged in said grooves forming in each of said grooves an elongated bonding member adhering both to said blocks and the prestressed metal tie member, transmitting tension created by said prestressed metal tie member as compression to said blocks so as to force the same toward each other.

2. A composite structural unit comprising in combination an elongated assembly of a plurality of blocks, said elongated block assembly provided in its bottom face with at least one symmetrically arranged continuous groove extending in longitudinal direction of said elongated block assembly and having a cross-sectional area being a fraction only of the cross-sectional area of the finished composite structural unit; at least one prestressed metal tie member disposed in said groove and being under an effective pre-stressed tension of at least 20,000 lbs. per square inch; and an adhesive filler arranged in said groove forming an elongated bonding member adhering both to said blocks and said prestressed metal tie member, transmitting tension created by said prestressed metal tie member as compression to said blocks so as to force the same toward each other.

3. A composite structural unit comprising in combination an elongated assembly of a plurality of blocks, said elongated block assembly provided in its external surface with at least one continuous groove extending in longitudinal direction of said elongated block assembly and having a cross-sectional area being a fraction only of the cross-sectional area of the finished composite structural unit; at least one prestressed metal tie member disposed in said continuous groove near the external surface of said elongated block assembly and being under an effective tension of at least 20,000 lbs. per square inch; and an adhesive arranged in said continuous groove forming an elongated bonding member adhering both to said blocks and said prestressed metal tie member, transmitting tension created by said prestressed metal tie member as compression to said blocks so as to force the same toward each other.

4. A composite structural unit according to claim 3 in which the individual blocks are hollow.

5. A composite structural unit according to claim 3 in which jointing material is provided between the individual blocks of the assembly.

6. A composite structural unit according to claim 3 in which the individual blocks of the assembly have end faces directly abutting against each other.

7. A composite structural unit according to claim 3 in which the individual blocks are provided at their ends with engaging projections.

8. A composite structural unit according to claim 3 in which intermediate plates are provided at the joints between the individual blocks of the assembly.

9. Method of manufacturing composite structural units comprising in combination the steps of assembling a plurality of blocks each of which is provided in its external surface with a groove, said blocks being assembled in such a manner that said grooves are aligned in longitudinal direction of the block assembly; placing a thin metal tie member in said aligned grooves of said block assembly; anchoring said thin metal tie member to independent anchorages provided beyond the ends of said block assembly so that said block assembly is free of compression by said anchorages; tensioning said thin metal tie member against said independent anchorages so that the tensioning stress in said metal tie member is substantially uniform over the entire length between said independent anchorages and in excess of 20,000 lbs. per square inch; arranging an adhesive filler in said aligned grooves of said block assembly while maintaining said tensioning stress applied to said metal tie member so that said adhesive filler is allowed to harden and to firmly adhere both to said blocks and said metal tie member while said metal tie member is under prestress, forming thereby a firm bond between the tensioned metal tie member and each of said blocks; releasing thereafter the tension at at least one of said independent anchorages; and severing said metal tie member between said independent anchorages and said block assembly.

10. Method of manufacturing composite structural units comprising the steps of arranging in the aligned grooves of a block assembly of blocks each of which is provided with a groove, a thin metal tie member being anchored to independent anchorages arranged beyond opposite ends of said block assembly under a tension in excess of 20,000 lbs. per square inch so that said block assembly is free of compression by said independent anchorages; arranging an adhesive filler in said aligned grooves of said block assembly while maintaining said tensioning stress applied to said metal tie member so that said adhesive filler is allowed to harden and to firmly adhere both to said blocks and said metal tie member while said metal tie member is under prestress, forming thereby a firm bond between the tensioned metal tie member and each of said blocks; releasing thereafter the tension at at least one of said independent anchorages; and severing said metal tie member between said independent anchorages and said block assembly.

PAUL WILLIAM ABELES.

References Cited in the file of this patent

UNITED STATES PATENTS

| Number | Name | Date |
|---|---|---|
| Re. 11,356 | Lee | Aug. 8, 1893 |
| 375,999 | Jackson | Jan. 3, 1888 |
| 461,028 | Lee | Oct. 13, 1891 |
| 752,694 | Lund | Feb. 23, 1904 |
| 1,028,578 | Lund | June 4, 1912 |
| 1,445,945 | Henderson | Feb. 20, 1923 |
| 2,184,137 | Brewer | Dec. 19, 1939 |
| 2,210,553 | Miller | Aug. 6, 1940 |
| 2,455,153 | Abeles | Nov. 30, 1948 |

FOREIGN PATENTS

| Number | Country | Date |
|---|---|---|
| 338,864 | Great Britain | Nov. 18, 1930 |
| 556,572 | Great Britain | Oct. 11, 1943 |